US011334533B2

(12) United States Patent
Kumar et al.

(10) Patent No.: US 11,334,533 B2
(45) Date of Patent: *May 17, 2022

(54) DYNAMIC STORAGE TIERING IN A VIRTUAL ENVIRONMENT

(71) Applicant: Veritas Technologies LLC, Santa Clara, CA (US)

(72) Inventors: Sanjay Kumar, Maharastra (IN); Venkatesha M. G., Cupertino, CA (US)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 16/524,709

(22) Filed: Jul. 29, 2019

(65) Prior Publication Data

US 2019/0354513 A1 Nov. 21, 2019

Related U.S. Application Data

(63) Continuation of application No. 15/294,976, filed on Oct. 17, 2016, now Pat. No. 10,380,078, which is a
(Continued)

(51) Int. Cl.
*G06F 16/185* (2019.01)
*G06F 3/06* (2006.01)

(52) U.S. Cl.
CPC .......... *G06F 16/185* (2019.01); *G06F 3/0604* (2013.01); *G06F 3/0605* (2013.01);
(Continued)

(58) Field of Classification Search
CPC .... G06F 16/185; G06F 3/0604; G06F 3/0647; G06F 3/0649; G06F 3/0667; G06F 3/0683; G06F 3/0685
(Continued)

(56) References Cited

U.S. PATENT DOCUMENTS 7,801,993 B2 * 9/2010 Shitomi .............. H04L 67/1097
709/226
10,380,078 B1 * 8/2019 Kumar .................. G06F 3/0649
(Continued)

FOREIGN PATENT DOCUMENTS

| CN | 102073462 A | 5/2011 |
| CN | 102214118 A | 10/2011 |
| CN | 102262557 B | 1/2015 |

OTHER PUBLICATIONS

Webster, John: "Automated Tired Storage for VMware," URL:http://www.hds.com/assets/pdf/hds-automated-tired-stroage-for-vmware.pdf, pp. 1-5, Aug. 1, 2011.

*Primary Examiner* — Syed H Hasan
*Assistant Examiner* — Nicholas E Allen

(57) ABSTRACT

Methods, computer program products, and computer systems for performing dynamic storage tiering in a virtual environment are disclosed. In one embodiment, such a method can include moving a storage object from a first storage tier of a storage system to a second storage tier of the storage system, which can be performed based, at least in part, on tiering information. Such moving can include determining a location of the storage object in the storage system by translating a location of the storage object in a virtual machine file to the location of the storage object in the storage system, using mapping information, and transmitting an instruction to a storage manager of the storage system. The instruction indicates that the storage manager should perform the moving. The mapping information translates a location in the virtual machine file to a corresponding location in the storage system.

20 Claims, 6 Drawing Sheets

Related U.S. Application Data continuation of application No. 13/327,366, filed on Dec. 15, 2011, now Pat. No. 9,471,243.

(52) U.S. Cl.
CPC .......... *G06F 3/0647* (2013.01); *G06F 3/0649* (2013.01); *G06F 3/0667* (2013.01); *G06F 3/0683* (2013.01); *G06F 3/0685* (2013.01)

(58) Field of Classification Search
USPC ........................................................ 707/831
See application file for complete search history.

(56) References Cited

U.S. PATENT DOCUMENTS

| | | | |
|---|---|---|---|
| 2002/0091702 A1* | 7/2002 | Mullins | G06F 16/25 |
| 2006/0041719 A1* | 2/2006 | Chui | G06F 12/0866 |
| | | | 711/117 |
| 2006/0206687 A1* | 9/2006 | Vega | G06F 12/10 |
| | | | 711/206 |
| 2006/0265508 A1* | 11/2006 | Angel | H04L 29/12047 |
| | | | 709/230 |
| 2007/0179934 A1* | 8/2007 | Basov | G06F 16/24556 |
| 2008/0134178 A1* | 6/2008 | Fitzgerald | G06F 9/45537 |
| | | | 718/1 |
| 2009/0144545 A1* | 6/2009 | Dhuvur | G06F 21/552 |
| | | | 713/165 |
| 2010/0005151 A1* | 1/2010 | Gokhale | G06F 16/27 |
| | | | 709/216 |
| 2010/0070725 A1* | 3/2010 | Prahlad | G06F 11/1453 |
| | | | 711/162 |
| 2010/0077160 A1 | 3/2010 | Liu et al. | |
| 2010/0083285 A1* | 4/2010 | Bahat | G06F 16/907 |
| | | | 719/328 |
| 2010/0281230 A1* | 11/2010 | Rabii | G06F 12/121 |
| | | | 711/165 |
| 2010/0332401 A1* | 12/2010 | Prahlad | H04L 63/0428 |
| | | | 705/80 |
| 2010/0332990 A1* | 12/2010 | Prah | H04L 67/1097 |
| | | | 715/735 |
| 2010/0333116 A1 | 12/2010 | Prahlad et al. | |
| 2011/0082836 A1 | 4/2011 | Wang et al. | |
| 2011/0113468 A1* | 5/2011 | Waissbein | H04L 63/102 |
| | | | 726/1 |
| 2011/0126197 A1* | 5/2011 | Larsen | G06F 9/455 |
| | | | 718/1 |
| 2011/0145818 A1* | 6/2011 | Vemuri | G06F 3/067 |
| | | | 718/1 |
| 2011/0161295 A1* | 6/2011 | Ngo | G06F 11/1446 |
| | | | 707/639 |
| 2011/0161299 A1* | 6/2011 | Prahlad | G06F 16/128 |
| | | | 707/649 |
| 2011/0167217 A1* | 7/2011 | Montgomery | G06F 3/0649 |
| | | | 711/114 |
| 2011/0179082 A1* | 7/2011 | Vaghani | G06F 16/1774 |
| | | | 707/781 |
| 2011/0191559 A1* | 8/2011 | Li | G06F 12/16 |
| | | | 711/162 |
| 2011/0197046 A1* | 8/2011 | Chiu | G06F 3/0685 |
| | | | 711/171 |
| 2011/0202705 A1* | 8/2011 | Hayashi | G06F 3/0685 |
| | | | 711/6 |
| 2011/0219048 A1* | 9/2011 | Cross | G06F 16/00 |
| | | | 707/821 |
| 2011/0276539 A1* | 11/2011 | Thiam | G06F 11/1448 |
| | | | 707/634 |
| 2012/0260040 A1* | 10/2012 | Mallge | G06F 16/278 |
| | | | 711/117 |

* cited by examiner

DYNAMIC STORAGE TIERING IN A VIRTUAL ENVIRONMENT

CROSS-REFERENCE TO RELATED APPLICATION

The present patent application is a continuation of U.S. patent application Ser. No. 15/294,976, filed on Oct. 17, 2016, entitled "Dynamic Storage Tiering In A Virtual Environment," which is a continuation of U.S. patent application Ser. No. 13/327,366, filed on Dec. 15, 2011, and entitled "Dynamic Storage Tiering In A Virtual Environment," now U.S. Pat. No. 9,471,243, which are incorporated by reference herein in their entirety and for all purposes as if completely and fully set forth herein.

FIELD OF THE INVENTION

This invention relates to organization of data and, more particularly, to performing storage tiering in a virtual environment.

DESCRIPTION OF THE RELATED ART

A multi-tier storage system includes storage devices that have different attributes, e.g., performance characteristics, arranged into separate tiers based on the attributes of the storage devices. The practice of moving data between the various tiers of a multi-tier storage system based on characteristics of the data is known as storage tiering. Storage tiering can provide various benefits, such as lowering the cost of data storage and improving performance for various types of computing systems.

A tiering policy can specify one or more criteria that dictate which tier in the multi-tier storage system a given storage object, e.g., file, should be stored in. A computer system can implement the tiering policy by detecting whether a given storage object meets one or more criteria specified in the tiering policy. Based on whether the storage object meets the criteria, the computer system can relocate the storage object from one tier of the multi-tier storage system to another tier of the multi-tier storage system.

Dynamic storage tiering refers to the practice of implementing a storage tiering policy on storage objects that are accessible by one or more applications. This avoids the need to take the storage objects "off-line" to perform storage tiering operations. Example storage tiering operations include detecting whether a storage object meets a criterion in a storage tiering policy and relocating the storage object from a first tier of the multi-tier storage system to a second tier of the multi-tier storage system.

Storage tiering can be implemented in a virtual environment. A virtual environment is a computing environment that includes one or more virtual machines. Virtual machines are software implementations of a physical computer that execute computer instructions in the manner of physical computer hardware. A virtual machine is implemented using a virtual machine file (e.g., an image file stored in a computer memory) that comprises information for starting and operating the virtual machine on a host computer system. Whether a single computer or a group of networked computers, many (if not most) of today's computer systems are able to act as host computer systems to virtual machines.

A host computer system includes an operating system, known as a host operating system. The host operating system implements a host file system. The host operating system uses the host file system to organize and manipulate storage objects, e.g., files, used by the host computer system. The host operating system views a virtual machine file as one such storage object.

A virtual machine also includes an operating system, known as a guest operating system. The guest operating system implements a guest file system. The guest operating system uses the guest file system to organize and manipulate storage objects, e.g., files, used by the virtual machine.

The host operating system and guest operating system are separate operating systems and do not view virtual machine files at the same level of detail. The host operating system sees the virtual machine file as a single file and is unaware of any logical organization of data (such as files created by the guest file system) within the virtual machine file. As a result, storage tiering operations performed by the host are unable to effectively select a tier in which to place individual storage objects used by the virtual machine.

SUMMARY OF THE INVENTION

The present disclosure describes methods, computer program products, computer systems, and the like for performing dynamic storage tiering in a virtual environment are disclosed. In one embodiment, such a method can include moving a storage object from a first storage tier of a storage system to a second storage tier of the storage system, which can be performed based, at least in part, on tiering information. Such moving can include determining a location of the storage object in the storage system by translating a location of the storage object in a virtual machine file to the location of the storage object in the storage system, using mapping information, and transmitting an instruction to a storage manager of the storage system. The instruction indicates that the storage manager should perform the moving. The mapping information translates a location in the virtual machine file to a corresponding location in the storage system.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
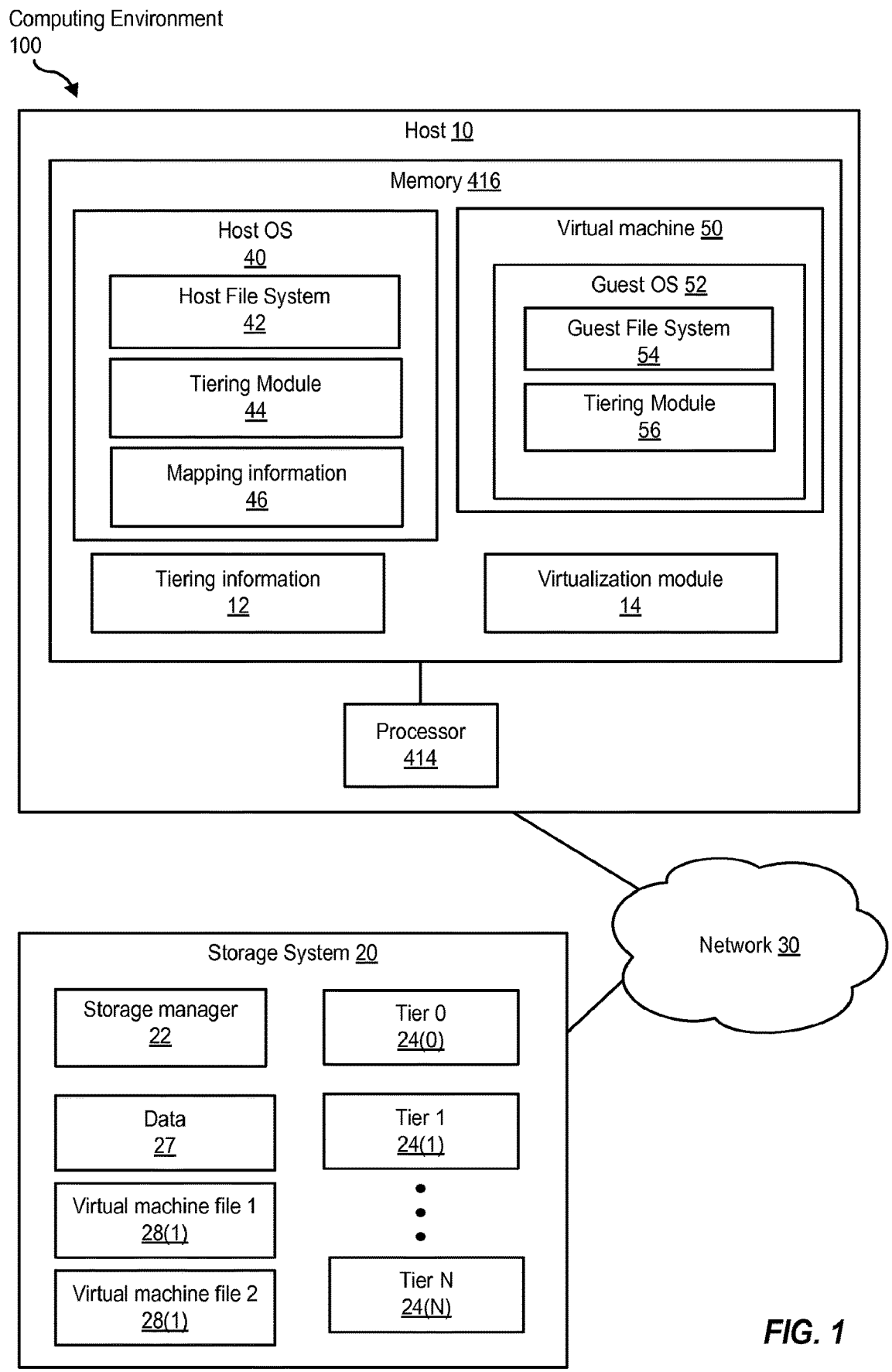
FIG. 1 is a block diagram of a system that performs dynamic storage tiering in a virtual environment, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Dynamic storage tiering (DST) includes the process of determining which data should be stored in which tier of a multi-tier storage system. Data can be organized into a variety of groupings, or storage objects. For example, data can be logically grouped into a file. Another type of grouping, formed at a physical level, is a block, or chunk. Storage tiering operations can be performed on any type of storage object.

DST is an effective way of limiting the cost of storing data as DST can be used to ensure that data is moved to lower cost tiers whenever appropriate, as dictated by a tiering policy. However, in certain circumstances, the efficacy of DST can be limited. For example, in the case of a typical host operating system performing DST in a computing environment that includes virtual machines, the host operating system typically sees the virtual machine as a single virtual machine file. Thus, the host operating system can only perform DST operations on the virtual machine file as a whole. This may be inefficient as virtual machine files can be quite large and it is possible that only a portion of the data in the virtual machine file actually meets a tiering policy's criteria. For instance, the virtual machine file can be divided into a number of storage objects, e.g., files, by a file system implemented by a guest operating system executed by the virtual machine. However, the host operating system is not privy to the divisions of data into individual files that the guest operating system makes within the virtual machine file.

Consider the example where a specific file within the virtual machine file is hot enough, e.g., due to frequent I/O accesses to the file, to require storage in the top tier of a multi-tier storage system, while the remainder of the virtual machine file is cool enough to be stored in a lower tier. The host operating system sees the temperature of the entire virtual machine file as the temperature of the specific file and stores the entire virtual machine file in the top tier. This unnecessarily increases the cost of storage for the virtual machine file by requiring that the entire virtual machine file be stored in the top tier. In fact it is only a specific file of the virtual machine file that should be stored in the top tier and the remaining data in the virtual machine file could be relocated to a lower tier, thus reducing the cost of storing the virtual machine file.

FIG. 1 is a block diagram of a computing environment 100 that performs dynamic storage tiering. As shown, computing environment 100 includes host 10 coupled to storage system 20 by network 30. Network 30 can include a WAN (Wide Area Network), such as the Internet, one or more LANs (Local Area Networks), and/or one or more SANs (Storage Area Networks).

Host 10 is a computing device, or portion of computing device, such as a personal computer, laptop computer, server, personal digital assistant, cell phone, or the like. Host 10 is configured to host one or more virtual machines, such as virtual machine 50. The resources of host 10 are shared by any virtual machines implemented on host 10.

Host 10 includes memory 416 coupled to processor 414. Memory 416 is, in an embodiment, random access memory (RAM). Memory 416 stores program instructions executable by processor 414 to implement host operating system 40, which implements host file system 42 and includes tiering module 44. Host operating system 40 also includes mapping information 46.

Memory 416 also stores program instructions executable by processor 414 to implement virtual machine 50, which executes guest operating system 52, which implements guest file system 54 and tiering module 56. Memory 416 also stores tiering information 12 and virtualization module 14. Virtualization module 14 performs operations related to creation and management of virtual machines and resources for virtual machines. Virtualization module 14 is illustrated as a stand-alone module but can also be included in host operating system 40. Virtualization module 14 provides host 10 the ability to concurrently support one or more virtual machines, such as virtual machine 50. Virtualization module 14 provides this ability by coordinating the distribution of computer resources (e.g., processing power, memory, etc.) to the virtual machines so that the virtual machines operate similarly to physical computers. Virtualization module 14 can be designed to support virtual machines by coordinating processor resources to support the execution of instructions on behalf of the virtual machines, and performing memory management to help ensure that the virtual machines effectively share the host computer's system memory.

Storage system 20 can include multiple individual storage devices. Each storage device can have different characteristics, such as input/output (I/O) performance, data availability, and relative cost characteristics. A storage system administrator can divide the storage devices of storage system 20 into multiple tiers. The administrator can group storage devices that have relatively similar characteristics into tiers. For example, if storage system 20 includes several solid state drive (SSD) storage devices, several Fibre Channel (FC) storage devices, and several serial advanced technology attachment (SATA) devices, the administrator can divide storage system 20 into three tiers based on device type. That is, the administrator can divide storage system 20 into a first tier comprised of SSD devices, a second tier comprised of FC devices, and a third tier comprised of SATA devices. The first tier is likely to have the best performance of the three tiers given that SSD devices are high performance devices relative to FC devices and SATA devices. Data stored in the first tier of SSD devices is likely to be accessible more quickly and reliably that data stored in the second tier and third tier. However, SSD devices are also relatively high cost, so it is more expensive to store data in the first tier than in the second tier and third tier. Therefore, moving data from the higher tiers to lower tiers represents a reduction in total storage cost. However, some data is more important, and should be stored in the highest possible tier.

While the example above lists three possible types of tiers, multi-tier storage systems such as storage system 20 are not limited to three tiers, nor are they necessarily divided by typed of device. For example, tiers can be created using tape drives or other types of storage devices. Tiers can be created based on the age or technology used in the storage devices, or various other attributes, e.g., cost of the storage devices. Typically, a multi-tier storage system such as storage system 20 includes a hierarchy of tiers with each tier being comprised of storage devices that have similar attributes to each other, with the attributes being distinguishable from those of storage devices in other tiers. The top tier in the hierarchy provides the most desirable, based on storage objectives, performance characteristics (e.g., speed, capacity) and the lowest tier provides the lowest performance. The hierarchy can also be organized by cost, e.g., with the top tier providing the highest cost per unit of storage and the lowest tier providing the lowest cost per unit of storage. A multi-tier storage system can be organized according to other principles or organizational objectives.

Storage system 20 provides persistent data storage, such that data stored in storage system 20 will remain stored even after storage system 20 is powered off. Storage system 20 can include one or more storage devices or storage appliances such as, for example, a solid state drive, a fibre channel device, a hard disk, a compact disc (CD), a digital versatile disc (DVD), sequential access media (e.g., tape storage), or other mass storage device, file serving appliance, or storage system (e.g., a redundant array of independent disks (RAID) system or an optical storage jukebox). Storage system 20 can also include one or more types of storage media, including solid state media (e.g., flash drives), optical media (e.g., CDs and DVDs), and magnetic media (e.g., hard disks or magnetic tape). In an embodiment, storage system 20 can be implemented using cloud storage, in which storage system 20 is a logical storage device to which physical storage device(s) are allocated on an as-needed and/or as-contracted basis.

Storage system 20 includes multiple tiers 24(0) through 24(N), where N is an integer greater than or equal to two and indicates the number of tiers in storage system 20. Each tier can be composed of one or more homogenous storage devices of a different type than those in the other tiers, e.g., tier 24(0) can include exclusively solid state drives and tier 24(1) can include exclusively hard disks. Tiers can also be organized based on one or more performance characteristics. For example, tier 24(0) can include storage devices that are relatively high speed, and tier 24(1) can include storage devices that are relatively low speed. For example, tier 24(0) can include high speed hard drives, e.g., newer technology, and tier 24(1) can include lower speed hard drives, e.g., older technology. In an embodiment, each tier can include multiple types of storage devices. Tiers can also be formed based upon access time, security, geographic location, any other physical or logical characteristic of the devices in storage system 20. In an embodiment, a first tier is SSD, a second tier is Fibre Channel LUN, and a third tier is SATA.

Storage manager 22 provides storage management functions. For example, when host operating system 40 determines that a file should be moved from one tier to another, host operating system 40 can transmit an instruction to storage manager 22. Storage manager 22 can generate an instruction to perform the move.

Storage system 20 also includes data 27 and virtual machine files 28. Virtual machine file 28(1) and virtual machine file 28(2) store data used to implement a virtual machine, such as virtual machine 50. Virtual machine files 28 (e.g., VMDK, VHD and the like) include multiple blocks of data that are accessible by a guest operating system, such as guest operating system 52, executed by a virtual machine, such as virtual machine 50. The multiple blocks of data in the virtual machine files are arranged using a variety of techniques (e.g., flat files, sparse files and the like). Guest operating system 52 is configured to create various storage objects, such as partitions, logical drives, dynamic disks, volumes, and files within virtual machine files 28 for use by, for example, virtual machine 50. The storage objects can comprise device drivers, operating system files, various data and metadata, as well as a number of software packages for virtualizing hardware and software of the host computer system. Executing a virtual machine file 28 generates virtual machine 50.

Storage system 20 can include any number of virtual machine files, within the limits of the capacity of storage system 20. Generally, each virtual machine file is instantiated as a virtual machine on a host system. While FIG. 1 shows a single host with a single virtual machine, additional hosts and virtual machines are omitted only for the sake of clarity, and no limitation on the number of hosts and virtual machines that computing environment 100 can support is implied.

Host 10 is configured to perform tiering operations, by virtue of including tiering module 44 and tiering information 12. Tiering information 12 includes a policy that forms the basis for tiering decisions. The policy included in tiering information 12 includes one or more criteria that specify conditions that determine which tier of a multi-tier storage system, such as storage system 20, a storage object belongs in. For example, the policy can specify that storage objects that are accessed more frequently than a specified frequency should be stored in tier 24(0). The policy can specify that storage objects that are accessed less frequently than the specified frequency, but more frequently than a second specified frequency, should be stored in tier 24(1).

The policy to help determine which data should be stored in which tier can be developed by an administrator. A criterion, such as a temperature range, can be specified in the policy as being associated with each tier in storage system 20. For example, the policy can specify that more frequently accessed storage objects should be stored in higher tiers of storage system 20 and less frequently accessed storage objects should be stored in lower tiers of storage system 20. In order to implement the policy, host operating system 40 can track how frequently a storage object is accessed. The frequency of access of a storage object is known as the temperature of the storage object. The more frequently accessed the storage object is, the 'hotter' the storage object is. Similarly, the less frequently accessed the storage object is, the 'cooler' the storage object is. A tiering policy based on temperature specifies one or more temperature thresholds or one or more temperature ranges. For example, the policy can specify that any data that has a temperature hotter than a given value, e.g., that has been accessed more frequently than a certain number of times per given period, should be located in the top tier of a multi-tier storage system, such as storage system 20. The policy can specify that data that has a temperature cooler than the given value, but hotter than a second value should be placed in a next lower tier, and so on.

While temperature is used as an example of the criteria used in a tiering policy to perform tiering operations, temperature is merely one example of numerous possible tiering criteria. For example, tiering criteria can also include owner or creator of a storage object, last access time, age, security information, related data, and the like.

A policy can be implemented automatically by a computer system, such as host 10. For example, the host operating system 40 of host 10 can track I/O access requests to a given storage object and compute a temperature for the storage object. Tiering module 44 of host operating system 40 can compare the temperature of the storage object with a temperature specified in a tiering policy included in tiering information 12 to detect if the policy indicates that the storage object should be moved to another tier of storage system 20, or if the storage object is located in the tier it belongs in, based on whether the storage object's temperature meets the temperature criteria specified by the tiering policy. Tiering module 44 can compare other characteristics of the storage object with other criteria of the tiering policy to detect whether the storage object should be moved from one tier to another tier.

If the tiering module detects, based on the tiering policy, that the storage object should be moved from a first tier to a second tier, host operating system 40 can initiate a move of the storage object. Host operating system 40 can specify an identifier of the storage object and a destination address to which the storage object should be relocated. For example, host operating system 40 can specify that a file, having a given file name, that is stored in a first volume be moved to a second volume. In this example, host operating system 40 is aware that the first volume is in the first tier and the second volume is in the second tier.

Tiering information 12 can specify multiple criteria for tiers in storage system 20. As in the above example, the policy can specify temperature criteria. The policy can also specify additional criteria. For example, the policy can specify that storage objects created by a certain user should be stored in tier 24(0), even if the storage objects do not satisfy the temperature criteria for inclusion in tier 24(0). That is, even if the temperature of a given storage object would mandate that the storage object be stored in a lower tier, if the storage object satisfies an additional criteria, e.g., the storage object was created by a specific user, the storage object will be stored in tier 24(0). The policy can include a hierarchy of criteria, with each criterion having a priority. Higher priority criteria override lower priority criteria.

Host 10 receives tiering information 12 from an outside source. For example, tiering information 12 can be loaded as part of an initial software installation on host 10. An administrator can update tiering information 12 manually, or tiering information 12 can be automatically updated on a periodic basis or in response to detecting that a new policy has been established.

Tiering module 44 implements the policy stored in tiering information 12. Tiering module 44 compares metadata related to a given storage object with the criteria specified in tiering information 12 and detects whether the storage object is stored in the appropriate tier. That is, tiering module 44 detects whether the storage object is stored in the tier indicated by policy that the storage object belongs in or if the storage object should be moved to another tier.

Tiering module 44 accesses metadata gathered by host operating system 40. Host operating system 40 gathers certain metadata about storage objects accessible by host file system 42 by default. For example, host operating system 40 identifies a last access time for files by default. Host operating system 40 can be configured to gather additional metadata in response to detecting that a tiering policy utilizes the additional metadata as a basis for tiering decisions. For example, host operating system 40 may not typically calculate temperature for a file. However, in response to receiving a policy that considers temperature when assigning a file to a tier, host operating system 40 can begin calculating temperature for files.

If tiering module detects that a storage object should be moved to another tier, tiering module 44 indicates to host operating system 40 that the storage object should be moved and specifies which tier the storage object should be moved to. Host operating system 40 interprets the tier and specifies a destination address. Alternatively, host operating system 40 can specify a destination tier to storage manager 22 and storage manager 22 can detect which storage locations in storage system 20 correspond to that tier.

Host operating system 40 gathers metadata about storage objects that are accessible to host file system 42. Virtual machine files 28 are recognized by host file system 42 as storage objects, or files. Virtual machine files 28 contain individual storage objects. These storage objects are recognized by guest operating system 52, in particular by guest file system 54. However, the storage objects within virtual machine files 28 are not recognized by host file system 42.

Guest operating system 52 is configured to provide metadata about storage objects within virtual machine files 28 to host operating system 40. Once host operating system has this metadata, host operating system 40 can apply tiering policies to the storage objects within virtual machine files 28.

Host operating system 40 sees virtual machine file 28 as a single file. Virtual machine file 28 has a beginning location and a number of blocks allocated to virtual machine file 28. Host operating system 40 knows the locations of the blocks of virtual machine file 28. That is, host operating system 40 knows which blocks in storage system 20 belong to virtual machine file 28. Once host operating system 40 can identify which blocks within virtual machine file 28 belong to particular storage objects within virtual machine file 28, tiering module 44 can perform tiering operations on those storage objects.

Virtual machine 50 executes guest operating system 52. Guest operating system 52 gathers metadata about storage objects that are accessible by guest file system 54. These storage objects include storage objects within the virtual machine file that stores virtual machine 50, e.g., one of virtual machine files 28.

Host 10 can mount virtual machine file 28. This allows host file system 42 to access the metadata gathered by guest operating system 52. With this access, host file system 42 can identify the files within virtual machine file 28. Alternatively, guest operating system 52 could transmit metadata to host operating system 40, e.g., via an agent implemented in virtual machine 50 or tiering module 56.

After host operating system 40 receives metadata describing the files in a virtual machine file, host operating system 40 generates a map that lists each file in the virtual machine file. Host operating system 40 stores the map in mapping information 46. The map also includes the locations of blocks within virtual machine file 28, as calculated by guest operating system 50, in particular by guest file system 54. For instance, a file F1 could include the $42^{nd}$, $43^{rd}$, and $54^{th}$ blocks of the virtual machine file, as counted by guest operating system 52, from the beginning of virtual machine file 28. Host operating system 40 can translate these block locations relative to virtual machine file 28 into locations relative to a storage location in storage system 20. Host operating system can include the translated locations for each of the blocks of the virtual machine file in the map. That is, host operating system 40 can calculate an address or offset for each of the blocks of the virtual machine file relative to the volume or storage device in which the virtual machine file is stored and add those addresses or offsets to a map stored in mapping information 46.

Once host operating system 40 identifies the files within virtual machine file 28, tiering module 44 can detect which portions of the virtual machine file are affected by a policy in tiering information 12. For example, if the policy specifies that all metadata should be located in a higher tier, tiering module 44 can identify which portions of virtual machine file 28 comprise metadata. Host operating system 40 can then initiate a move of the metadata to the higher tier. As another example, if the policy specifies that a specific type of file is subject to temperature criteria, tiering module 44 can identify files of the specific type in virtual machine file 28. Once files subject to the policy are identified, tiering module 44 can determine if any of the files should be moved to a different tier of storage system 20. That is, tiering module 44 can compare the files, in particular, metadata related to the files, with tiering criteria specified by the policy and detect whether the files should be moved.

Host operating system 40 can periodically access the metadata from virtual machine file 28 and update the list of files that are subject to the policy. Host operating system 40 also updates mapping information 46 in response to receiving or detecting changes to metadata relating to the organization of files by guest operating system 50 within virtual machine file 28.

If tiering module 44 detects that a file should be moved to a different tier from the tier the file is stored in at the time of the detection, tiering module 44 can indicate the need to move the file to host operating system 40. That is, tiering module 44 can pass information to host operating system 40 that a given file should be moved from a one tier to another tier. In response, host operating system 40 can initiate the move by executing a move command. Alternatively, host operating system 40 can transmit information indicating the file that should be moved and a source and/or destination tier to storage manager 22. Storage manager 22 can then issue instructions to the actual storage devices of storage system 20 to move the file.

In an embodiment, tiering module 44 can detect an access frequency for a virtual machine file's metadata. If tiering module detects that the access frequency is below a specified threshold, e.g., by comparing the access frequency to a frequency specified in a tiering policy, tiering module 44 concludes that the virtual machine implemented by the virtual machine file is no longer executing. In response to this conclusion, tiering module 44 can specify that all data of the virtual machine file should be relocated to a lower tier. Relocating the virtual machine file frees the space previously occupied by the virtual machine file to store additional data, e.g., additional virtual machine files.

Figure 2:
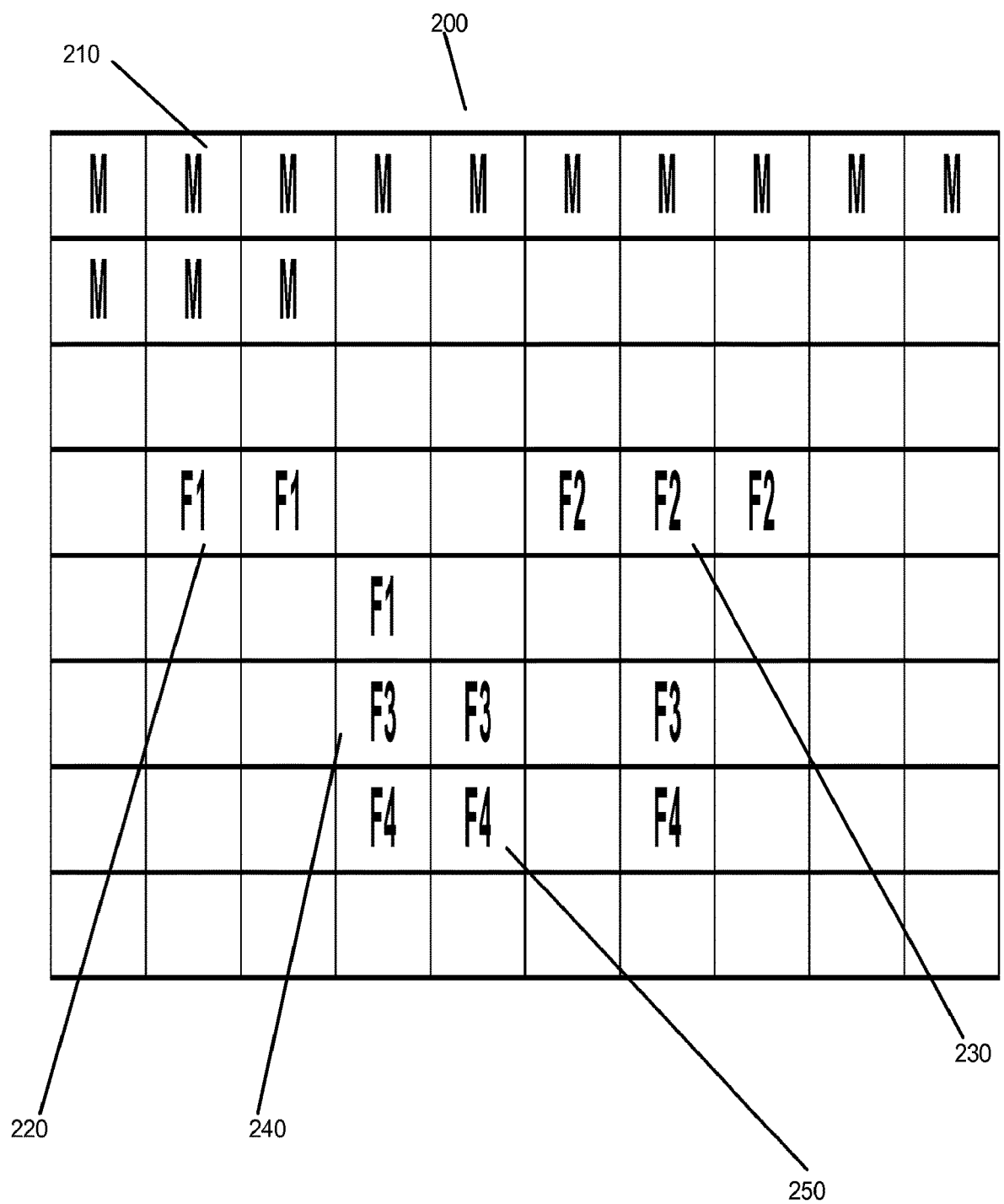
FIG. 2 is block diagram of a virtual machine file, according to one embodiment of the present invention.

FIG. 2 is block diagram of a virtual machine file 200. Virtual machine file 200 is shown divided into a number of portions. Each portion represents an extent. An extent is a contiguous region of storage. A guest operating, such as guest operating system 52 of FIG. 1 allocates the extents for various purposes, such as for file data or metadata. The guest operating system, in particular a file system implemented by the guest operating system, such as guest file system 54 of FIG. 1, keeps track of each extent of virtual machine file 200. Virtual machine file 200 comprises a number of discrete storage objects, e.g., files.

Virtual machine file 200 also includes metadata 210, as indicated by the locations marked "M." As shown, the first 13 locations of virtual machine file 200 store metadata 210. Metadata 210 includes, for example, a swap file, size, age, as access time, modification time, creation time, owner, and a list of locations of extents that store data of the file for each file of virtual machine file 200. In an embodiment, metadata 210 includes an inode table that comprises an inode for each file in virtual machine file 200. Metadata 210 is gathered and updated by the guest operating system.

Virtual machine file 200 also includes several files, including file 220, indicated by the locations marked F1, file 230, indicated by the locations marked F2, file 240, indicated by the locations marked F3, and file 250, indicated by the locations marked F4. Such files can include application data files, operating system files, and the like. The files can be stored in contiguous locations, or non-contiguous locations in virtual machine file 200. The guest operating system stores metadata indicating which locations of virtual machine file 200 are allocated to which file, and when the files are accessed and/or modified.

Figure 3:
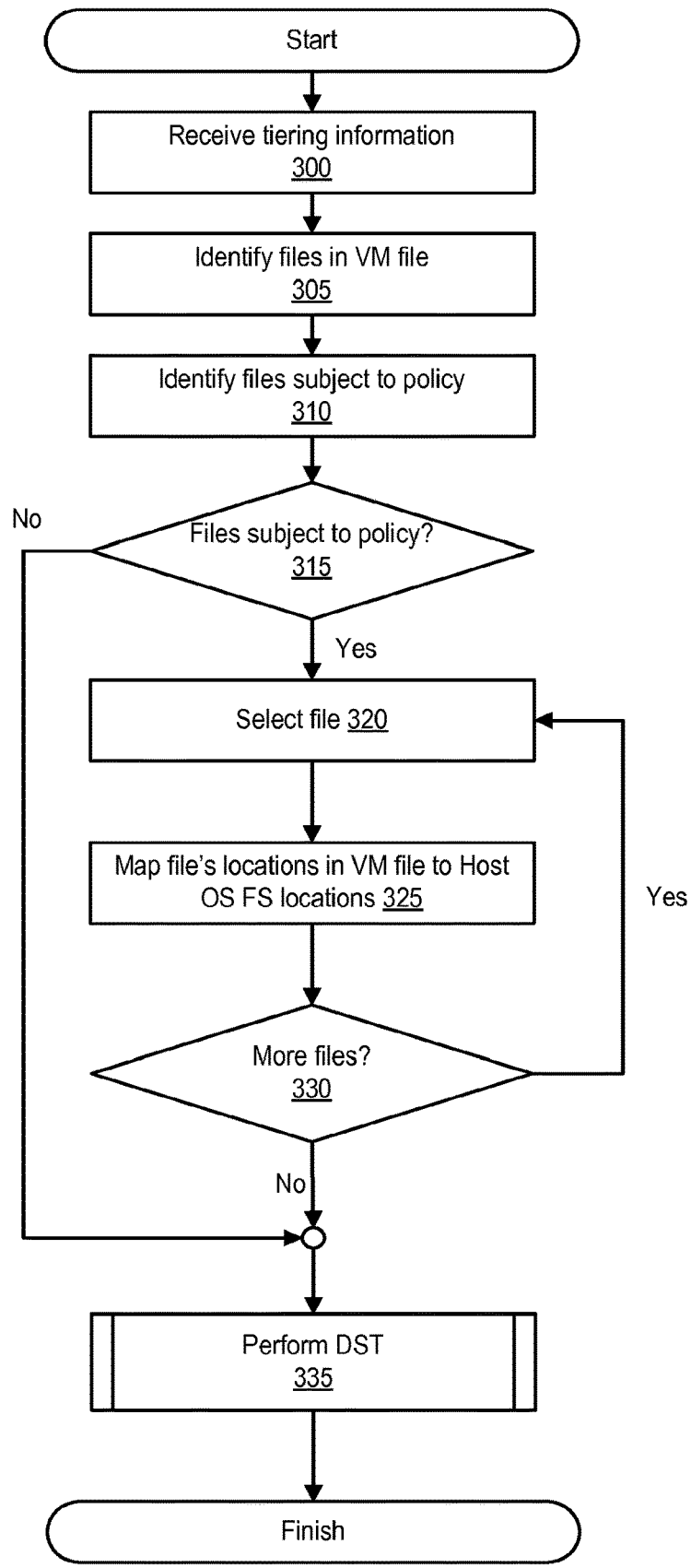
FIG. 3 is a flowchart depicting a method of determining locations of files in a virtual machine file, according to one embodiment of the present invention.

FIG. 3 is a flowchart depicting a method of determining locations of files in a virtual machine file. The method can be performed by a computing device, such as host 10 of FIG. 1, that implements a tiering module, such as tiering module 44 of FIG. 1.

The method begins at 300, where the host receives tiering information, such as tiering information 12 of FIG. 1. The tiering information can be received by a host operating system, such as host operating system 40 of FIG. 1. The tiering information can be received as a result of a manual configuration, e.g., by an administrator, or as part of an automatic software update.

The tiering information includes a tiering policy. The policy includes a set of criteria and a list of tiers of a multi-tier storage system, such as storage system 20 of FIG. 1. The criteria indicate what conditions should exist for a file or other storage object to be stored in each of the tiers. For example, the policy can include a criterion that states that files that have a temperature greater than a given value should be stored in a first tier.

At 305, the host operating system identifies files in a virtual machine file, such as virtual machine file 28 of FIG. 1. To do so, the host operating system accesses metadata describing the files in the virtual machine file. The host operating system can access this metadata via a guest operating system, such as guest operating system 52 of FIG. 1. To access metadata via the guest operating system, the host operating system mounts the virtual machine file in a host file system, such as host file system 42. Mounting the virtual machine file allows the host operating system to read metadata stored in the virtual machine file. Alternatively, the host operating system can receive the metadata from an agent or tiering module implemented by the guest operating system.

At 310 the host operating system identifies which, if any, files of the virtual machine file are subject to the policy. This involves the host operating system evaluating the policy and determining for each criterion if any files of the virtual machine file could or do meet the criterion. For example, if the policy includes a criterion that specifies which tier files created by a specific user should be stored in, the host operating system can detect if any of the files in the virtual machine file were created by the specific user. If so, the files created by the specific user are subject to the policy. The host operating system can create a list of files in the virtual machine file that are subject to the policy. At 315, the host operating system detects whether any files in the virtual machine file are subject to the policy. If the host operating system detects that no files in the virtual machine file are subject to the policy, the method proceeds to 335.

Otherwise, the host operating system selects a first file of the files subject to the policy at 320. At 325, the host operating system generates a map that translates the locations of the file relative to the virtual machine file into locations relative to a storage scheme used by the host operating system. The host operating system detects, at 330, whether any other files were identified as being subject to the tiering policy. If so, the method returns to 320, where the host operating system selects another file. Otherwise, the method proceeds to 335, which is discussed with regard to FIG. 4.

Figure 4:
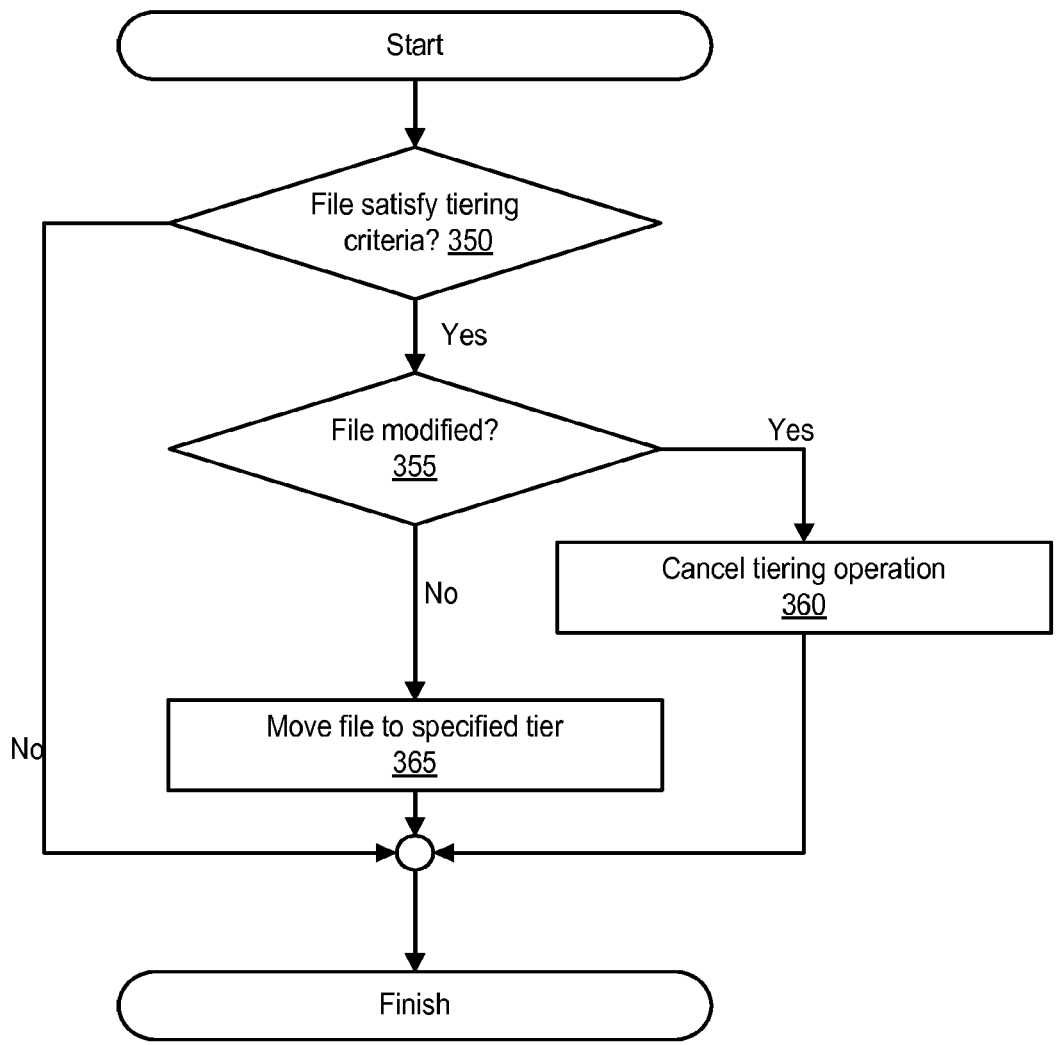
FIG. 4 is a flowchart depicting a method of performing dynamic storage tiering in a virtual environment, according to one embodiment of the present invention.

FIG. 4 is a flowchart depicting a method of performing dynamic storage tiering in a virtual environment. The method begins at 350, where a host operating system, such as host operating system 40 of FIG. 1, detects whether any files satisfy tiering criteria in a tiering policy, such as is included in tiering information 12 of FIG. 1. In particular, a tiering module, such as tiering module 44 of FIG. 1, detects whether any files satisfy the tiering criteria. The tiering module can detect that metadata associated with a file indicates that the file satisfies a tiering criteria. For example, the policy can include a temperature criteria that indicates files having a temperature above a certain value should be moved to a specific tier. Any file whose metadata indicates that the file is not in the correct tier, based on the files temperature (as calculated by the host operating system) meets a tiering criteria and should be moved to the appropriate tier. For example, if a file's metadata indicates that the file is cooler than a minimum temperature specified by the policy for the tier in which the file is located, the file meets a tiering criteria and should be moved to another (lower) tier. If no files satisfy the tiering criteria, the method ends.

If the tiering module detects that a file satisfies the tiering criteria, the method proceeds to 355. At 355, the host operating system detects whether the file has been modified. To do so, the host operating system can monitor metadata for the virtual machine file to detect any changes. In an embodiment, the metadata includes a bitmap that includes a bit for each file in the virtual machine file. If a bit corresponding to a file is dirtied, e.g., set, the file has been modified and the tiering operation is cancelled at 360.

If the host operating system does not indicate that the file has been modified, the file is moved into the tier specified by the tiering policy at 365 and the method ends. The move can be from one tier to a tier one higher or lower in the multi-tier storage system. Alternatively, the file can be moved up or down multiple tiers, e.g., from the lowest tier to the highest tier.

Figure 5:
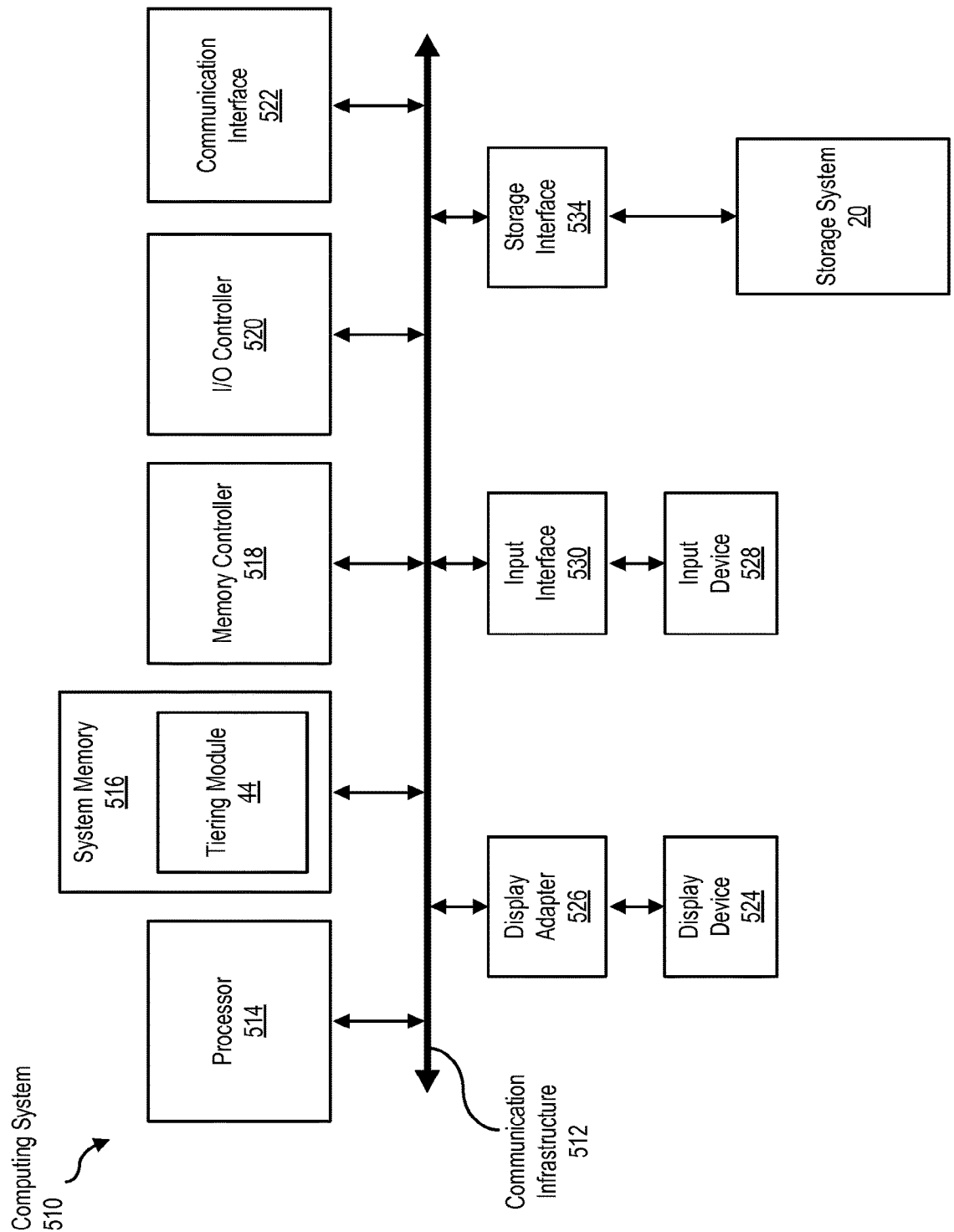
FIG. 5 is a block diagram of a computing device, illustrating how a tiering module can be implemented in software, according to one embodiment of the present invention.

FIG. 5 is a block diagram of a computing device, illustrating how a tiering module can be implemented in software. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a tiering module 44, computing system 510 becomes a special purpose computing device that is configured to perform DST in a virtual environment.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing a RAM module 135 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a data storage device 533 coupled to communication infrastructure 512 via a storage interface 534. Storage device 533 generally represents any type or form of storage device or medium capable of storing data and/or other computer-readable instructions. For example, storage device 533 may include a magnetic disk drive (e.g., a so-called hard drive), a floppy disk drive, an optical disk drive, a flash drive, or the like. Storage interface 534 generally represents any type or form of interface or device for transferring data between storage device 533 and other components of computing system 510.

In certain embodiments, storage device 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 533 may also include other similar structures or devices for allowing computer software, data, or other computer-readable instructions to be loaded into computing system 510. For example, storage device 533 may be configured to read and write software, data, or other computer-readable information. Storage device 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
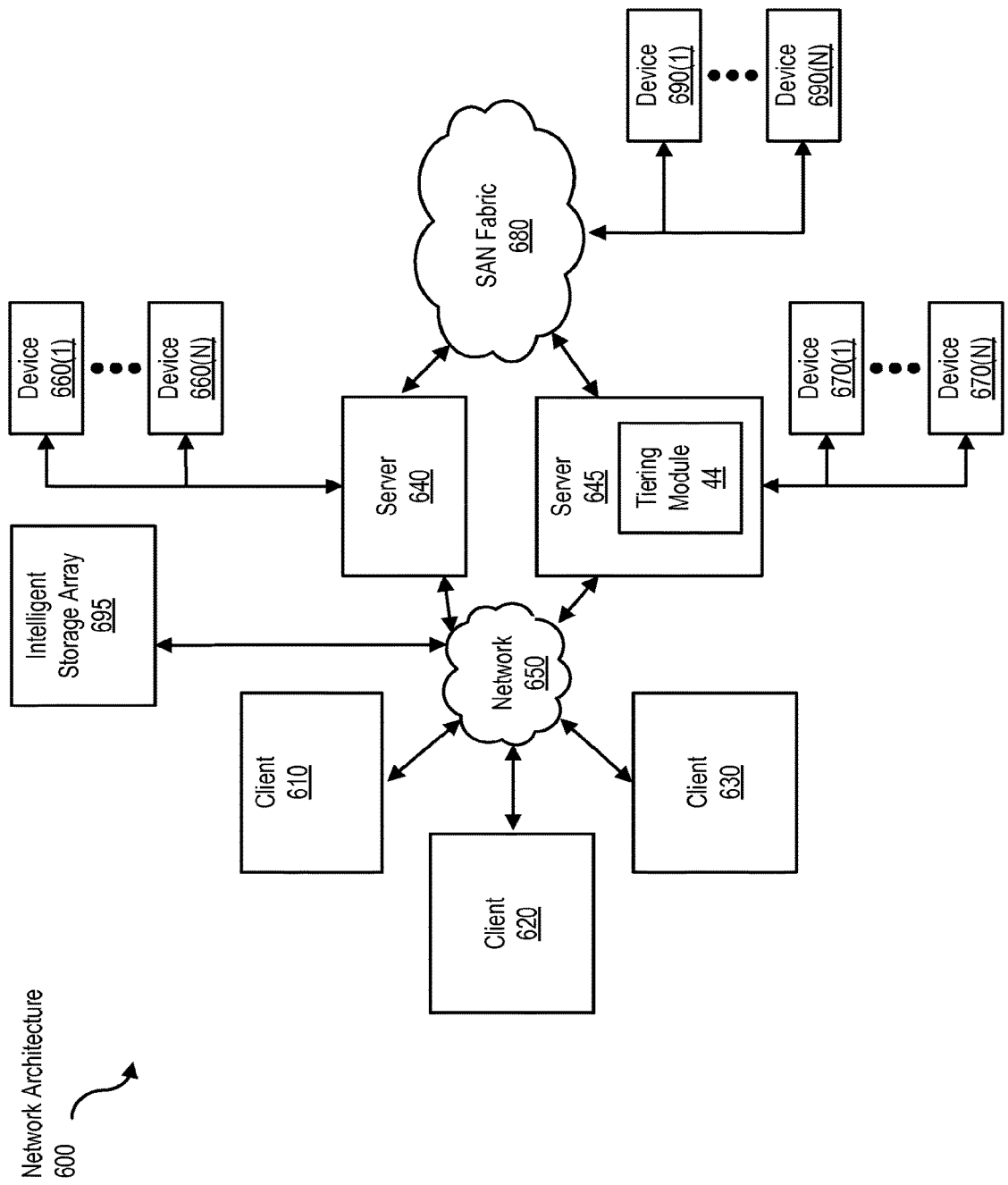
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or run certain software applications. Network 650 generally represents any telecommunication or computer network including, for example, an intranet, a wide area network (WAN), a local area network (LAN), a personal area network (PAN), or the Internet. In one example, servers 640 and/or 645 may include a RAM module 135 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a tiering module in FIG. 1 may transform behavior of a computing device in order to cause the computing device to perform DST operations in a virtual environment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
 causing a storage object to be moved from a first storage tier of a storage system to a second storage tier of the storage system, wherein the storage object is moved based, at least in part, on tiering information, the causing comprises
  determining a location of the storage object in the storage system by translating a location of the storage object in a virtual machine file to the location of the storage object in the storage system, using mapping information;
 transmitting an instruction to a storage manager of the storage system,
  the instruction indicates that the storage manager should move the storage object from the first storage tier to the second storage tier,
  the mapping information translates each of a plurality of locations in the virtual machine file to a corresponding location of a plurality of locations in the storage system,
  the plurality of locations in the virtual machine file comprise the location of the storage object in the virtual machine file, and
  the plurality of locations in the storage system comprise the location of the storage object in storage system; and
 updating the mapping information to translate the location of the storage object in the virtual machine file to a new location for the storage object in the storage system.

2. The computer-implemented method of claim 1, further comprising: detecting whether the storage object has been modified by monitoring metadata associated with the virtual machine file.

3. The computer-implemented method of claim 2, wherein the virtual machine file comprises a plurality of storage objects, the plurality of storage objects comprises the storage object, the metadata comprises a bitmap, and the bitmap comprises a bit for each storage object of the plurality of storage objects.

4. The computer-implemented method of claim 1, wherein the location of the storage object in the virtual machine file is a location according to a guest file system of a guest operating system, the virtual machine file and the guest operating system are associated with a virtual machine, the virtual machine is implemented by a host comprising a host operating system that implements a host file system, the location of the storage object in the storage system is a host-relative location in the host file system, and the translating translates the location according to the guest file system of the guest operating system to the host-relative location.

5. The computer-implemented method of claim 4, wherein the mapping information comprises a map, and the map comprises a location of each block of one or more blocks of the storage object in the virtual machine file.

6. The computer-implemented method of claim 5, wherein the locations of the one or more blocks are determined by the guest operating system.

7. The computer-implemented method of claim 4, wherein the storage object is a block of a plurality of blocks in the virtual machine file, and each block of the plurality of blocks is located at an offset from the location of the virtual machine file.

8. The computer-implemented method of claim 1, wherein the storage object is a block of a plurality of blocks in the virtual machine file, the storage manager moves one or more blocks of the plurality of blocks, and the one or more blocks are moved on a block-by-block basis.

9. The computer-implemented method of claim 1, wherein the storage object is moved as part of a tiering operation, the updating is performed as part of an updating operation, and the method further comprises:
  determining whether the storage object has been modified; and
  in response to a determination that the storage object has been modified, cancelling the tiering operation and canceling the updating operation.

10. The computer-implemented method of claim 1, wherein the determining is performed by a tiering module implemented in a guest operating system.

11. The computer-implemented method of claim 10, further comprising: receiving tiering information at the tiering module, wherein the tiering information comprises a tiering policy; and identifying the storage object as being subject to a tiering policy.

12. The computer-implemented method of claim 11, wherein the identifying comprises: detecting whether the storage object meets a criterion, wherein the criterion is specified in the tiering policy.

13. The computer-implemented method of claim 10, wherein the mapping information comprises a map, the map comprises locations of one or more blocks of the storage object in the virtual machine file as calculated by the guest operating system.

14. The computer-implemented method of claim 1, wherein the determining is performed by a tiering module implemented in a host operating system.

15. The computer-implemented method of claim 14, further comprising:
  receiving tiering information at the tiering module, wherein the tiering information comprises a tiering policy; and
  identifying the storage object as being subject to the tiering policy.

16. A computer system comprising:
  one or more processors;
  a computer-readable storage medium coupled to the one or more processors; and
  a plurality of instructions, encoded in the computer-readable storage medium and
    configured to cause the one or more processors to implement a storage manager,
    wherein the storage manager is configured to
    receive one or more instructions, wherein
      the one or more instructions comprise
        one or more move commands, and
        location information,
      the one or more move commands indicate that the storage manager should move a storage object from a first storage tier of a storage system to a second storage tier of the storage system,
      the location information identifies a location of the storage object in the storage system,
      the location in the storage system corresponds to a location of the storage object in a virtual machine file relative to a location of the virtual machine file in the storage system, and
      the storage manager is configured to manage the storage system,
    in response to receipt of the one or more instructions, perform a tiering operation,
    wherein
      the tiering operation comprises
        moving the storage object from the first storage tier to the second storage tier,
        the moving the storage object is performed based, at least in part, on tiering information,
        the location is determined using mapping information,
      the mapping information translates each of a plurality of locations in the virtual machine file to a corresponding location of a plurality of locations in the storage system,
      the plurality of locations in the virtual machine file comprise the location of the storage object in the virtual machine file, and
      the plurality of locations in the storage system comprise the location of the storage object in storage system, and
    update the mapping information to translate the location of the storage object in the virtual machine file to a new location for the storage object in the storage system.

17. The computer system of claim 16, wherein the computer system further comprises a tiering module, the location of the storage object in the storage system is determined by the tiering module, and the plurality of instructions comprise further instructions configured to cause the one or more processors to:
  receive tiering information at the tiering module, wherein
    the tiering module is implemented in at least one of a guest operating system or a host operating system, and
    the tiering information comprises a tiering policy; and
  identify the storage object as being subject to the tiering policy.

18. The computer system of claim 16, wherein the location of the storage object in the virtual machine file is a location according to a guest file system of a guest operating system,
  the virtual machine file and the guest operating system are associated with a virtual machine,
  the virtual machine is implemented by a host comprising a host operating system that implements a host file system,
  the location of the storage object in the storage system is a host-relative location in the host file system, and
  the location of the storage object in the virtual machine file is translated according to the guest file system of the guest operating system to the host-relative location.

19. A computer program product comprising:
  a plurality of instructions, implementing a storage manager and comprising
    a first set of instructions, executable by a processor of a computer system,
      configured to receive one or more instructions, wherein
      the one or more instructions comprise
        one or more move commands, and
        location information,
      the one or more move commands indicate that the storage manager should move a storage object from a first storage tier of a storage system to a second storage tier of the storage system,
      the location information identifies a location of the storage object in the storage system,
      the location in the storage system is a location of the storage object in a virtual machine file relative to a location of the virtual machine file in the storage system, and
      the storage manager is configured to manage the storage system, and a second set of instructions, executable by the processor, configured to, in response to receipt of the one or more instructions, perform a tiering operation, wherein
the tiering operation comprises
moving the storage object from the first storage tier to the second storage tier, and
the moving the storage object is performed based, at least in part, on tiering information, and
a third set of instructions, executable by the processor, configured to update mapping information to translate the location of the storage object in the virtual machine file to a new location for the storage object in the storage system; and
a non-transitory computer-readable storage medium, wherein the instructions are encoded in the non-transitory computer-readable storage medium.

20. The computer program product of claim 19, wherein a second plurality of instructions implement a tiering module, the location is determined by the tiering module, and the second plurality of instructions comprise:
a first subset of instructions, executable by the processor, configured to receive tiering information at the tiering module, wherein
the tiering module is implemented in at least one of a guest operating system or a host operating system, and
the tiering information comprises a tiering policy; and
a second subset of instructions, executable by the processor, configured to identify the storage object as being subject to the tiering policy.

* * * * *